US012631766B1

(12) United States Patent
Wong

(10) Patent No.: US 12,631,766 B1
(45) Date of Patent: May 19, 2026

(54) SINGLE-PATH DUAL-BAND GNSS FRONT-END SYSTEM FOR ASSET TRACKING AND TELEMATICS DEVICES

(71) Applicant: Geotab Inc., Oakville (CA)

(72) Inventor: Irene Ai May Wong, Oakville (CA)

(73) Assignee: Geotab Inc., Oakville (CA)

( * ) Notice: Subject to any disclaimer, the term of this patent is extended or adjusted under 35 U.S.C. 154(b) by 0 days.

(21) Appl. No.: 19/414,966

(22) Filed: Dec. 10, 2025

Related U.S. Application Data

(60) Provisional application No. 63/878,528, filed on Sep. 9, 2025.

(51) Int. Cl.
*G01S 19/36* (2010.01)
*G01S 19/34* (2010.01)

(52) U.S. Cl.
CPC .............. *G01S 19/36* (2013.01); *G01S 19/34* (2013.01)

(58) Field of Classification Search
CPC ................................. G01S 19/36; G01S 19/34
USPC ...................................................... 342/357.59
See application file for complete search history.

(56) References Cited

U.S. PATENT DOCUMENTS

2025/0123405 A1* 4/2025 Hartmeier ............. G01S 19/235

FOREIGN PATENT DOCUMENTS

CN          118625361 A  * 9/2024  ............. G01S 19/37

OTHER PUBLICATIONS

U-blox, NEO-F10N—Integration manual, 2023, ublox.*

* cited by examiner

*Primary Examiner* — Harry K Liu
(74) *Attorney, Agent, or Firm* — Sherif A. Abdel-Kader

(57) ABSTRACT

A single-path dual-band GNSS front-end system for asset tracking and telematics devices is provided. The system configures a GNSS antenna, a SAW filter, a low-noise amplifier (LNA), and a SAW diplexer to process both L1 and L5 signals, thereby reducing the number of required components, lowering power consumption, and minimizing PCB space while enhancing signal reliability in urban environments. The GNSS front-end system is part of a GNSS subsystem used in asset trackers and telematics devices. A method for processing dual-band GNSS signals in a single-path front-end system is also claimed, including receiving, filtering, amplifying, and separating L1 and L5 signals.

20 Claims, 12 Drawing Sheets

500

510

1100

SINGLE-PATH DUAL-BAND GNSS FRONT-END SYSTEM FOR ASSET TRACKING AND TELEMATICS DEVICES

RELATED APPLICATIONS

This application claims priority from U.S. provisional application 63/878,528 filed on Sep. 9, 2025, the contents of which are herein incorporated by reference in their entirety.

FIELD

The present invention relates generally to electronic systems and devices for telematics and asset tracking, including technologies for monitoring, managing, and determining the location of vehicles, equipment, and other mobile or stationary assets. More specifically, the invention pertains to a Single-Path Dual-Band GNSS Front-End System for Asset Tracking and Telematics Devices.

BACKGROUND

Asset tracking and telematics technologies have become essential tools for monitoring, managing, and optimizing the use of vehicles, equipment, and other valuable assets. These systems typically employ electronic devices that collect and transmit data related to asset location, movement, and condition, enabling organizations to improve operational efficiency, enhance security, and reduce costs. Asset tracking solutions are widely used in logistics, transportation, construction, fleet management, and industrial applications, while telematics systems provide additional capabilities such as vehicle diagnostics, fleet management, driver behavior monitoring, and remote-control functions.

A core component of modern asset tracking and telematics devices is the Global Navigation Satellite System (GNSS), which enables precise determination of asset location by receiving signals from satellite constellations such as GPS L1, GPS L5, Galileo, GLONASS, and BeiDou. GNSS-based positioning is critical for real-time tracking, geofencing, route optimization, and theft prevention. However, the reliability and accuracy of GNSS signals can be significantly compromised in certain environments, particularly in urban corridors and dense metropolitan areas.

Urban corridors, often referred to as "urban canyons," are characterized by tall buildings, narrow streets, and complex infrastructure that obstruct, reflect, or attenuate satellite signals. In these environments, GNSS receivers may experience multipath effects, signal fading, and frequent loss of satellite fixes, resulting in degraded location accuracy and unreliable tracking. Additionally, electronic interference from vehicle systems, instrument clusters, and nearby wireless devices can further disrupt GNSS signal reception. For example, certain vehicle dashboards emit radio frequency interference close to the GNSS L1 band, causing jamming and loss of positioning capability.

Conventional asset tracking and telematics devices that rely on single-band GNSS receivers are particularly vulnerable to these challenges. Signal blockage, multipath interference, and in-band jamming can lead to missed location updates, inaccurate tracking, and reduced operational effectiveness. As asset tracking applications expand into more demanding environments, there is a growing need for advanced GNSS front-end architectures that can mitigate interference, improve signal reliability, and deliver high accuracy positioning even in urban corridors and other harsh RF conditions.

SUMMARY

The present disclosure provides aspects for: a single-path dual-band GNSS front-end system; a method for processing dual-band GNSS signals in a single-path front-end system; an electronic device comprising a single-path dual-band GNSS front-end system including a GNSS receiver configured to receive separated L1 and L5 signals and compute a location; and an electronic device comprising a controller coupled to a GNSS receiver, a memory coupled to the controller, and a network interface configured to send the computed location to a remote server over a network, according to the appended claims.

In one aspect of the present disclosure, there is provided a single-path dual-band GNSS front-end system, comprising a GNSS antenna configured to receive GNSS signals in L1 and L5 frequency bands, a surface acoustic wave (SAW) filter configured to filter out unwanted out-of-band signals from the received GNSS signals, a low-noise amplifier (LNA) configured to amplify the filtered GNSS signals, and a SAW diplexer configured to separate the amplified GNSS signals into L1 and L5 frequency bands, wherein the system is configured to reduce the number of components compared to dual-path designs, thereby reducing power consumption and printed circuit board (PCB) space. This provides a compact architecture that lowers power draw, reduces cost, and simplifies layout.

The SAW diplexer may provide at least 40 dB isolation between the L1 and L5 frequency bands. This improves separation quality and minimizes inter-band interference for reliable positioning.

The low-noise amplifier may support multiple gain modes including a low-power mode, a standard mode, and a high-gain mode, and the gain mode may be selectable based on signal strength and power consumption requirements. This enables dynamic optimization of sensitivity and battery life.

The system may be configured to provide enhanced signal reliability in urban environments by utilizing the L5 band signal, which is at least 3 dB stronger than the L1 band signal. This secures robust fixes in challenging RF conditions.

The SAW filter may be configured to attenuate cellular and ISM band signals by at least 38 dB. This improves GNSS signal integrity by rejecting aggressive out-of-band interferers. The LNA may be controlled by a microcontroller via GPIO lines. This enables on-the-fly gain management for balanced performance and efficiency.

The SAW diplexer may be a micro-acoustic diplexer having a three-port configuration with a common antenna port and two channel ports for L1 and L5 bands. This eases integration and reduces external matching needs.

The GNSS antenna may be a broadband antenna supporting GPS L1, GPS L5, Galileo, GLONASS, and BeiDou constellations. This increases signal availability and improves accuracy.

The single-path dual-band GNSS front-end system may further comprise an LTE notch filter positioned ahead of the SAW filter to reject LTE second harmonic interference. This reduces in-band jamming and stabilizes fixes near cellular radios.

The front-end may be implemented on a multi-layer printed circuit board with 50Ω impedance-matched RF traces. This improves RF performance and manufacturability. The single-path dual-band GNSS front-end system may further comprise a notch filter positioned upstream of the SAW filter and configured to filter out cellular frequency bands. This strengthens immunity to nearby transmitters.

The notch filter may be configured to attenuate LTE second harmonic interference. This mitigates harmonic leakage that could desensitize the receiver.

In another aspect of the present disclosure, there is provided a method for processing dual-band GNSS signals in a single-path front-end system, comprising receiving GNSS signals in L1 and L5 frequency bands via a GNSS antenna, filtering the received GNSS signals to remove unwanted out-of-band signals using a surface acoustic wave (SAW) filter, amplifying the filtered GNSS signals with a low-noise amplifier (LNA), and separating the amplified GNSS signals into L1 and L5 frequency bands using a SAW diplexer, wherein the method reduces the number of components compared to dual-path designs, thereby reducing power consumption and printed circuit board (PCB) space. This enhances efficiency while maintaining high-quality dual-band processing.

The method of the foregoing aspect may further comprise providing at least 40 dB isolation between the L1 and L5 frequency bands using the SAW diplexer. This improves separation quality and reduces mutual interference.

The method of the foregoing aspect may further comprise selecting a gain mode for the low-noise amplifier from among a low-power mode, a standard mode, and a high-gain mode, based on signal strength and power consumption requirements. This improves sensitivity control and battery management.

The method of the foregoing aspect may further comprise enhancing signal reliability in urban environments by utilizing the L5 band signal, which is at least 3 dB stronger than the L1 band signal. This maintains fixes in multipath- and blockage-prone areas.

The method of the foregoing aspect may further comprise controlling the gain mode of the LNA using a microcontroller via GPIO signals. This enables adaptive amplification for changing RF conditions.

The method of the foregoing aspect may further comprise filtering LTE second harmonic interference using a notch filter prior to the SAW filter. This reduces in-band noise that can mask satellite signals.

The method of the foregoing aspect may further comprise matching the impedance of the GNSS antenna to the front-end system using a matching network. This improves power transfer and reduces reflections.

The method of the foregoing aspect may further comprise supporting GNSS signals from multiple bands and multiple constellations including GPS L1, GPS L5, GLONASS, Galileo, and BeiDou. This increases satellite visibility and enhances accuracy.

The method of the foregoing aspect may further comprise implementing the front-end system on a multi-layer PCB with 50Ω RF traces. This improves RF performance and consistency in production.

The method of the foregoing aspect may further comprise filtering out cellular frequency bands from the received GNSS signals using a notch filter positioned upstream of the SAW filter. This strengthens resilience to co-located radios.

In the method, the notch filter may be configured to attenuate LTE second harmonic interference. This reduces desensitization caused by harmonic overlap.

In yet another aspect of the present disclosure, there is provided an electronic device comprising a single-path dual-band GNSS front-end system including a GNSS antenna configured to receive GNSS signals in L1 and L5 frequency bands, a surface acoustic wave (SAW) filter configured to filter out unwanted out-of-band signals from the received GNSS signals, a low-noise amplifier (LNA) configured to amplify the filtered GNSS signals, and a SAW diplexer configured to separate the amplified GNSS signals into L1 and L5 frequency bands, a GNSS receiver configured to receive the separated L1 and L5 signals and compute a location, a controller coupled to the GNSS receiver, a memory coupled to the controller, and a network interface configured to send the computed location to a remote server over a network, wherein the electronic device is configured to reduce the number of components compared to dual-path designs, thereby reducing power consumption and printed circuit board (PCB) space. This yields a compact, power-efficient asset-tracking platform with robust positioning.

The SAW diplexer may provide at least 40 dB isolation between the L1 and L5 frequency bands. This minimizes crosstalk and improves dual-band fidelity.

The low-noise amplifier may support multiple gain modes including a low-power mode, a standard mode, and a high-gain mode, and the gain mode may be selectable based on signal strength and power consumption requirements. This enhances sensitivity while managing energy use.

The electronic device may be configured to provide enhanced signal reliability in urban environments by utilizing the L5 band signal, which is at least 3 dB stronger than the L1 band signal. This improves tracking continuity in dense cities.

The GNSS receiver may be configured to provide position, velocity, and time data at a rate of at least 25 Hz. This supports high-frequency updates for real-time applications.

The network interface may be configured to transmit location data using a cellular, LoRaWAN, or Ethernet connection. This increases deployment flexibility across diverse networks.

The controller may be configured to select the LNA gain mode based on received signal strength indication. This optimizes performance under varying signal conditions.

The memory may store GNSS location data and sensor data for later transmission. This enables reliable logging and deferred reporting.

The electronic device may further comprise one or more sensors selected from the group consisting of a motion sensor, temperature sensor, and pressure sensor. This expands asset condition monitoring capabilities.

The GNSS receiver may be configured to operate with multiple GNSS constellations including GPS L1, GPS L5, Galileo, GLONASS, and BeiDou. This increases satellite availability and improves accuracy.

The electronic device may be powered by a battery and may include an energy harvester such as a solar panel. This extends operating life and reduces maintenance.

The electronic device may further comprise a notch filter positioned upstream of the SAW filter and configured to filter out cellular frequency bands. This enhances immunity to co-located cellular radios.

The notch filter may be configured to attenuate LTE second harmonic interference. This improves reception quality by suppressing in-band harmonics.

DETAILED DESCRIPTION

Asset Tracking

Figure 1:
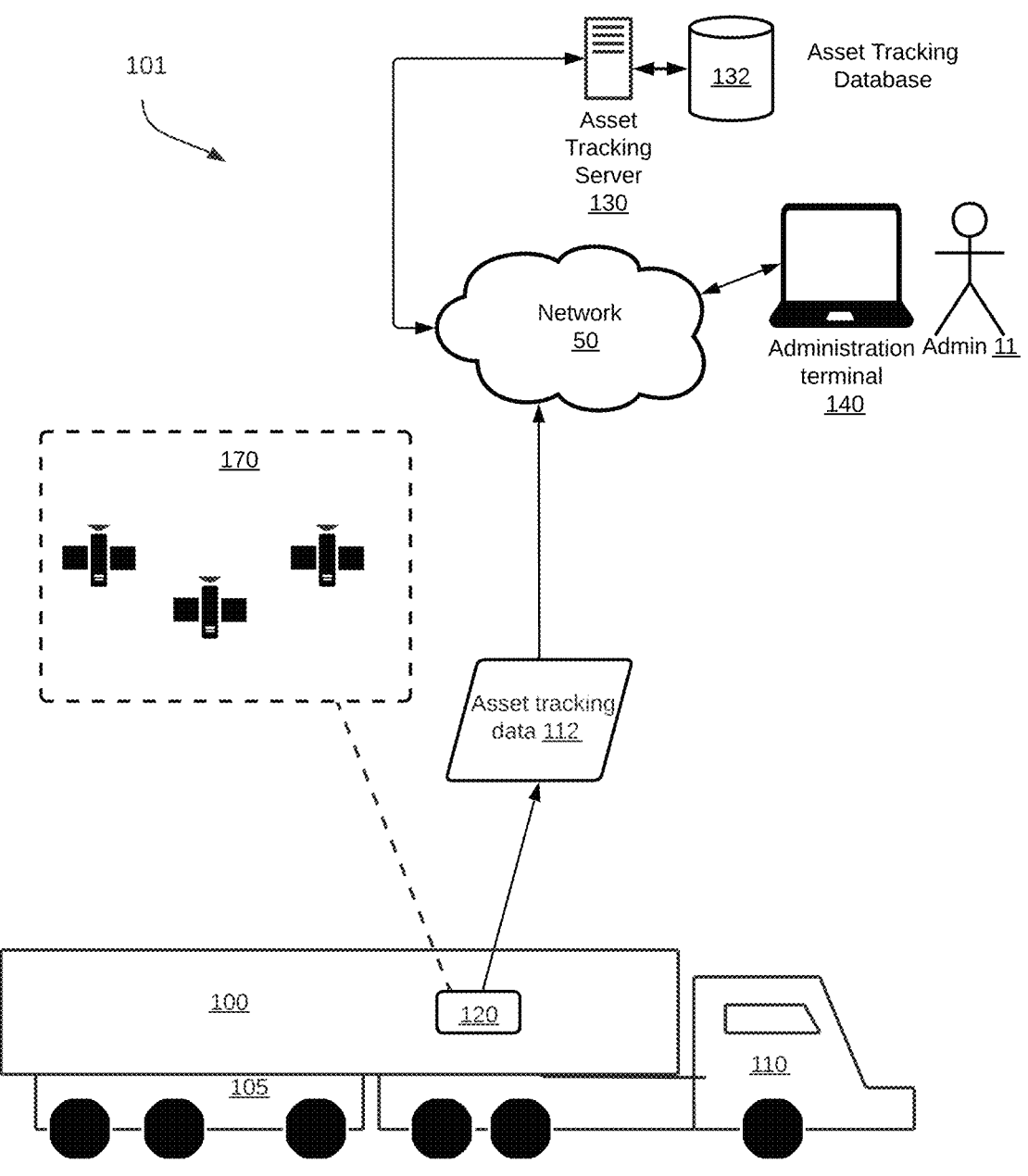
FIG. 1 is a schematic diagram of an asset tracking system including an asset tracker coupled to an engineless asset.

An asset tracker is an electronic device used to monitor the location and status of various assets. An asset may be a vehicle, a piece of equipment, a shipping container, a trailer, a tank, or any other type of asset whose location and condition need to be tracked. An asset tracker is typically part of an asset tracking system such as the asset tracking system 101 depicted in FIG. 1.

Asset Tracking System

An asset tracking system 101 is designed to monitor and manage remote assets. This system typically comprises an asset tracker 120 deployed within an asset 100, a network 50, an asset tracking server 130, an administration terminal 140, and satellites 170. While single instances are shown for simplicity, multiple instances of each component are common. The asset 100 can be highly diverse, ranging from a shipping container on a trailer 105 coupled to a tractor 110, to vehicles, industrial equipment, construction equipment, or tanks holding chemicals. These assets may be transported by a ship, a train, an airplane, or other means, or be towable machines like a generator, a concrete mixer, or a compressor.

The asset tracker 120 is an electronic device connected to the asset 100, configured to track its location, movement, and/or condition. It can be powered by a battery, or a rechargeable battery with an energy harvester such as a solar panel. To determine location, the asset tracker 200 communicates with satellites 170, which are part of a Global Navigation Satellite System (GNSS) like GPS, GLONASS, Galileo, or BeiDou, with other less common systems including QZSS and IRNSS or NavIC also available. The asset tracker 120 also contains or is coupled to an inertial measurement unit (IMU) and/or sensors for data such as temperature, light, and pressure. The combination of location data, movement data, and sensor data is collectively termed asset tracking data 112, which the asset tracker 120 sends to the asset tracking server 130 over the network 50.

The network 50 serves as the communication backbone, providing connectivity between the asset tracker 200 and the asset tracking server 130, and also between the administration terminal 140 and the asset tracking server 130. This network can be a single network or a combination of various technologies, including cellular networks utilizing 2G (GSM, GPRS, EDGE), 3G (UMTS, HSPA), 4G (LTE), 5G, or NB-IoT (a low-power wide-area network part of the 3GPP standard). Alternatively, the network 50 may comprise non-cellular Wide Area Network (WAN) technologies like WiMAX (based on IEEE 802.16 standards), LoRaWAN, or Weightless (open standard LPWAN technology operating in sub-GHz frequency bands). instances where the asset tracker 200 has wired connectivity to an asset, the network 50 can use wired technologies such as Ethernet, Fast Ethernet, Local Talk™, Token Ring, Fiber Distributed Data Interface (FDDI), and Asynchronous Transfer Mode (ATM).

One possible networking technology the asset tracker 120 can use to communicate to an asset tracking server is direct-to-cell (DTC). This technology allows devices to bypass the need for a local ground station or gateway by communicating directly with satellites in low Earth orbit. These satellites then relay the data to a ground station, which sends it to the asset tracking server 130. When the asset tracker loses cellular coverage, it can utilize direct-to-cell to continue transmitting its location and status information.

The asset tracking server 130 is an electronic device, typically a computer system or cluster, responsible for receiving, storing, and analyzing the asset tracking data 112. It processes, aggregates, and analyzes this data to generate useful asset information, storing it along with analytics results in an asset tracking database 132. The administration terminal 140, an electronic device such as a laptop, desktop, smartphone, Augmented Reality (AR) headset, or Network Operations Center (NOC), connects to the asset tracking server 130 via the network 50. An administrator 11 uses this terminal to retrieve data and analytics, set alerts and geofences for tracking assets and receiving notifications (e.g., deliveries or an asset moving outside a service area), and issue commands to the asset tracker 200 through the server. When alert criteria are met, the asset tracking server 130 sends messages to the administration terminal 140 to notify the administrator 11.

Asset trackers are typically powered by a battery. Some asset trackers are powered by a rechargeable battery coupled to an energy harvester, such as a solar panel. Other asset trackers are powered by a non-rechargeable battery. Some battery-powered asset trackers are also capable of being powered by an external power source. In the depicted example of FIG. 1, the asset tracker 120 may be powered by the battery of the tractor 110 via a trailer harness connection. Additionally, the asset tracker trackers may also receive indicator signal lines such as an ignition signal also via the trailer harness. In other implementations, the asset tracker is installed in a refrigerated container or trailer, known as a "reefer". In such implementations, the asset tracker may receive power from the reefer battery which is charged by a generator powered by an engine, such as a diesel engine. The asset tracker may receive an indicator signal from the reefer indicating that the ignition is on for the engine.

The electronic device for which a power module is provided in this disclosure may also be a telematics device.

Telematics Device

Figure 2:
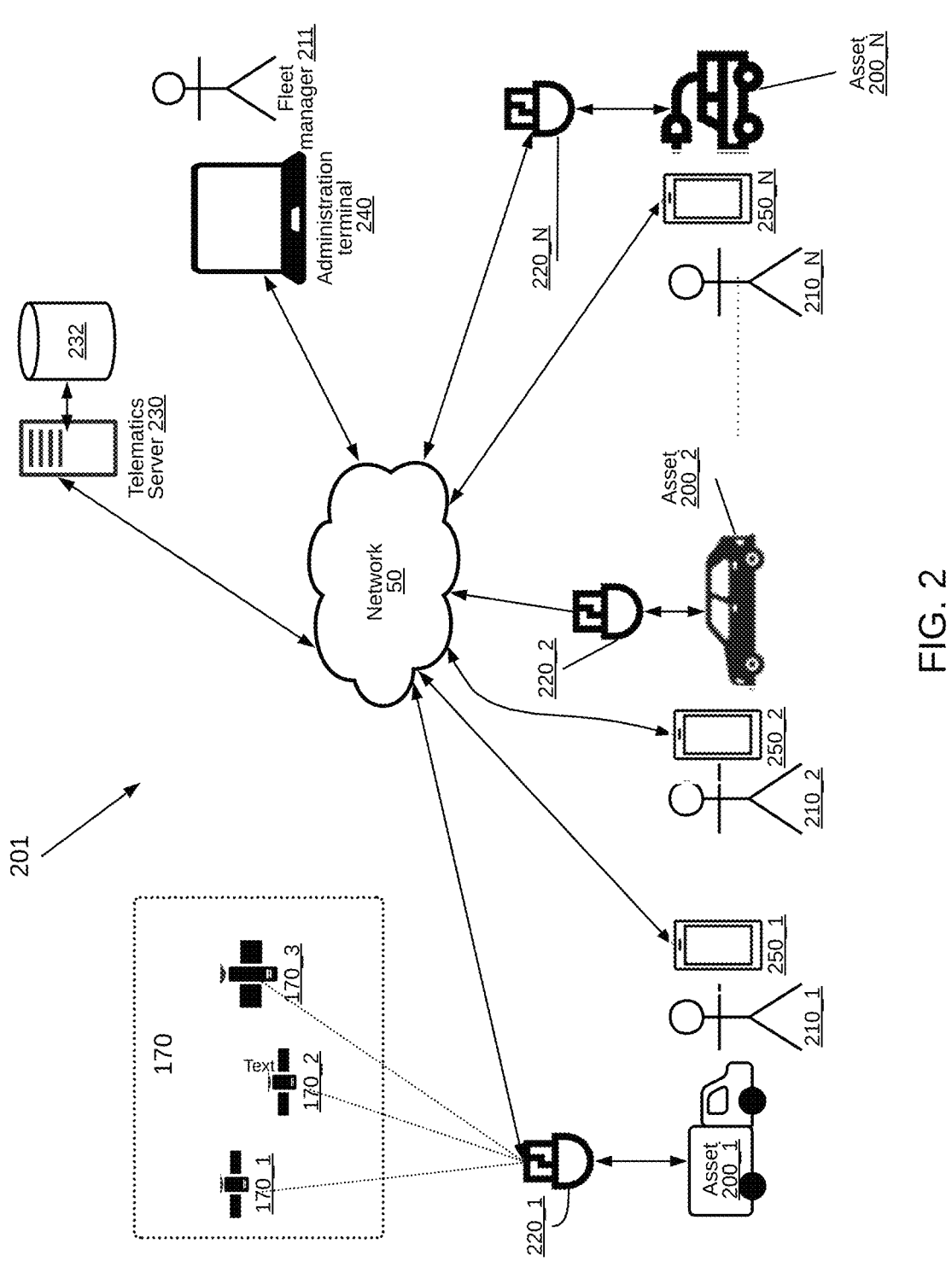
FIG. 2 is a schematic diagram of an exemplary telematics system including a plurality of telematics devices coupled to a plurality of vehicular assets.

A telematics device is an electronic device that combines telecommunications and informatics to collect and transmit data, often used in vehicles to monitor location, speed, engine health, and driver behavior. A telematics device is typically part of a telematics system such as the telematics system 201 depicted in FIG. 2. A telematics system integrates telecommunications and informatics to monitor and manage remote assets, including vehicles and other equipment, collecting data from a high number of assets either directly or through telematics devices. A telematics device is a hardware component that enables telematics functionality by collecting and transmitting data related to an asset's performance, location, and operating status, and can be either a self-contained unit or integrated into the asset. The telematics system 201 includes a telematics server 230, (N) telematics devices 220 (labeled 220_1, 2202, . . . 220_N) coupled to assets 200 (labeled 200_1, 200_2, . . . 200_N), a network 50, an administration terminal 240, and (N) operator terminals 250 (labeled 250_1, 250_2, . . . 250_N). The assets 200 can be diverse, encompassing land vehicles such as trucks, passenger cars, and electric vehicles (EVs), along with unshown types like farming, construction, and military vehicles. Land vehicles primarily use internal combustion engines (ICEs) (gasoline, diesel, four-stroke, two-stroke, rotary) or various forms of EVs, including Battery Electric Vehicles (BEVs), Hybrid Electric Vehicles (HEVs), Plug-in Hybrid Electric Vehicles (PHEVs), Extended-Range Electric Vehicles (EREVs), and Fuel Cell Electric Vehicles (FCEVs), with solar-powered electric vehicles also contemplated. Beyond land vehicles, assets can be marine or airborne vehicles utilizing ICEs, electric motors, jet engines, or rocket propulsion, or even stationary machines like generators, concrete mixers, or compressors.

Data collection relies on the telematics device 220 to capture asset data, which is often combined with location data from a location module in communication with satellites 170 (part of a Global Navigation Satellite System (GNSS) like GPS, GLONASS, Galileo, or BeiDou as discussed above) and/or sensor data from internal or coupled sensors. Together, this is termed "telematics data". Assets, particularly vehicles, may contain a plurality of electronic control units (ECUs), potentially around seventy ECUs in a vehicle, interconnected via an asset communications bus. The Controller Area Network (CAN) bus is the most commonly used type for real-time control, though others like Local Interconnect Network (LIN), FlexRay, and Ethernet networks also exist. ECUs exchange information in CAN data frames. An interface port, such as an OBD-II port in a passenger car, provides access to this asset data and may also supply electric power to the connected telematics device. The asset port may also include one or more indicator signals, such as an ignition signal. Common communication protocols over a CAN bus include SAE J1939 for trucks and heavy vehicles, and SAE J1979 (OBD-II) for passenger vehicles, with others like UDS, ISO 9141, KWP2000, and DoIP (using Ethernet) also in use. The collected telematics data is then sent by the telematics device to the telematics server 230 over a network 50.

The network 50 facilitates communication between telematics devices, the telematics server, and administration and operator terminals. This network can be a single network or a combination of networks, as discussed above.

For monitoring and management, the telematics server 230 (a computer system or cluster) is responsible for receiving, storing, and analyzing the asset tracking data. It processes, aggregates, and analyzes telematics data to generate asset information for individual assets or entire fleets, storing results in a telematics database 232. The administration terminal 140, which can be a laptop, desktop, smartphone, Augmented Reality (AR) headset, or Network Operations Center (NOC), connects to the server to retrieve data and analytics, set alerts and geofences (for deliveries, vehicle conditions, driver behavior), and issue commands to telematics devices, typically by a fleet manager 211. Similarly, operator 210 uses operator terminals 250 (often smartphones) (labeled 210_1, 2102, . . . 210_N) to both track and configure asset usage. Operators 210 can use an asset configuration application to inform the server of their current asset association, report operation duration or stops, and even configure the telematics device. The telematics server also provides additional analytics related to operators 210, including hours of server, time, location, and operating parameters, and can correlate telematics data like turning, speeding, and braking information to the vehicle's driver. When alert criteria are met, the server sends messages to the administration terminal, operator terminal, or even the telematics device itself to generate in-vehicle alerts such as a beep, displayed message, or audio message.

Electronic Device

Figure 3:
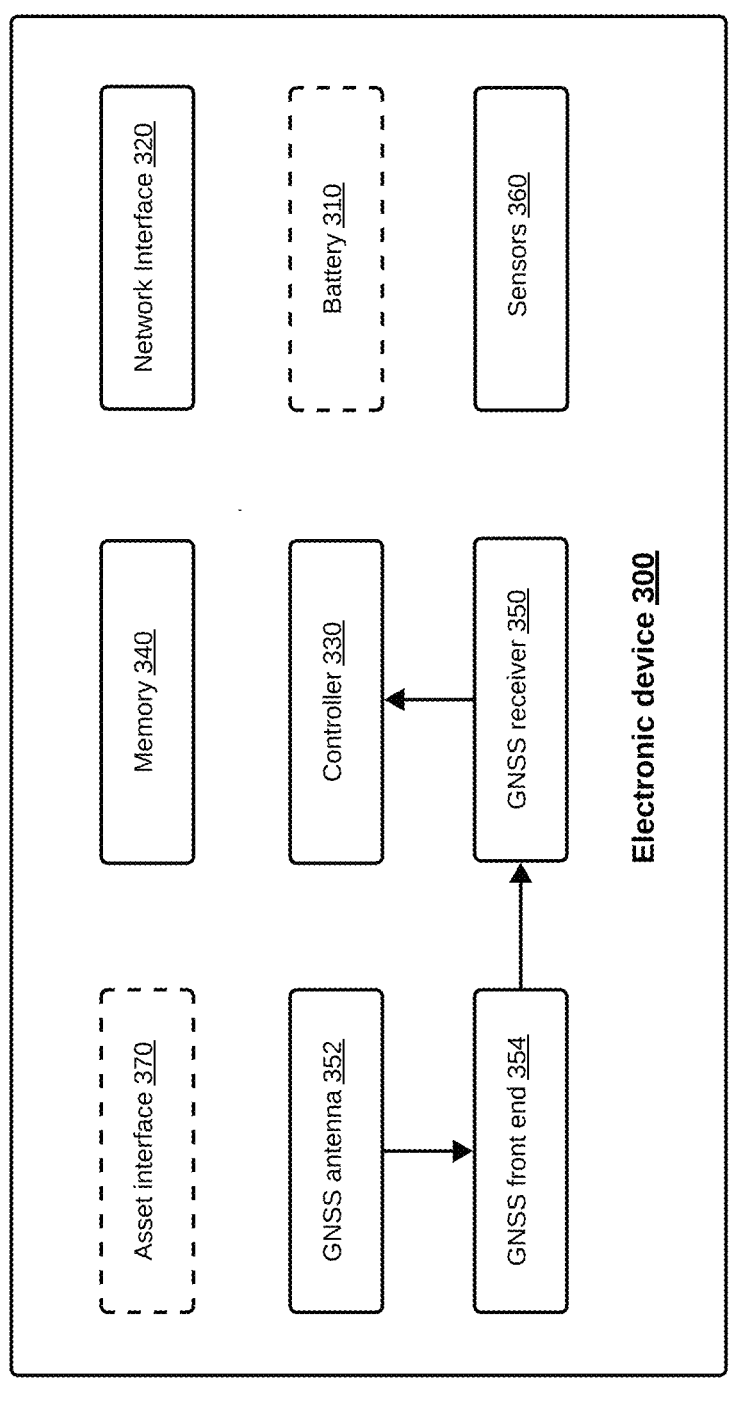
FIG. 3 is a block diagram depicting an exemplary electronic device suitable for deployment in an asset, such as a vehicle.

FIG. 3 shows a block diagram of an electronic device 300 that is well-suited for deployment in an asset, such as a vehicle. Examples of the electronic device 300 include asset trackers and telematics devices. The electronic device 300 includes a battery 310, a network interface 320, a controller 330, a memory 340, a GNSS receiver 350, a GNSS antenna 352, a GNSS front end 354, sensors 360, and an asset interface 370.

The battery 310 is used to power the electronic device 300. The battery 310 is a non-rechargeable battery. The battery 310 may use any of commonly available suitable battery types. In one implementation, the battery 310 is an Li—SOCl2 battery. Li—SOCl2 batteries excel in high energy density, long shelf life (10-20+ years), wide operating temps, and stable voltage—ideal for remote sensors needing infrequent changes. In another implementation, the battery is a Li—MnO2 battery. Li—MnO2 batteries also offer good energy density, a low self-discharge rate (though generally higher than Li—SOCl2), and a wide operating temperature range (typically −40° C. to +85° C.). The battery 310 is shown in dashed lines since some electronic devices, such as telematics devices, may not have a built-in battery and operate solely on external power such as the asset battery 372.

The network interface 320 can utilize various cellular technologies including 2G (GSM, GPRS, EDGE), 3G (UMTS, HSPA), 4G (LTE), 5G, and NB-IoT (a 3GPP LPWAN technology). The network interface 320 can also use non-cellular WAN technologies like WiMAX (IEEE 802.16), LoRaWAN (LPWAN), and Weightless (open standard LPWAN). Additionally, the network interface 320 supports wired network technologies such as Ethernet, Fast Ethernet, LocalTalk, Token Ring, FDDI, and ATM when connected to a compatible asset. The network interface 320 transmits to a remote server via a network and receives configuration instructions or data requests. It can be integrated into controller 330 or connected via parallel or serial interface (SPI, 12C, UART, USB, or SDIO).

Controller 330 can be any combination of processors (processor, microprocessor, MCU, CPU, SOC, processing core), state machines, logic gate arrays, ASICs, FPGAs, or other hardware capable of executing instructions. It may use Von Neumann, Harvard, or Modified Harvard Architecture. Controller 330 can be a CISC or RISC processor, with single or multiple cores for parallel execution. It may have internal memory for storing instructions.

Memory 340 is an electronic storage component for storing data and machine-executable programming instructions. Memory 340 may be ROM (PROM, EPROM, EEPROM, or Flash), RAM (SRAM and DRAM), FRAM, MRAM, or PCM, or any combination. Memory 340 stores machine-executable programming instructions and/or data to support functionality. Memory 340 is coupled to controller 330 via a bus, enabling controller 330 to execute instructions and/or access data.

The GNSS antenna 352 is a broadband antenna configured to receive GNSS signals in one or more frequency bands. The GNSS antenna 352 supports multiple satellite bands and constellations, including GPS L1, GPS L5, Galileo, GLONASS, and BeiDou, enabling enhanced signal availability and positioning accuracy.

The GNSS front end 354 is configured to process GNSS signals received from the GNSS antenna 352 prior to delivery to the GNSS receiver 350. The GNSS front end 354 may include one or more surface acoustic wave (SAW) filters configured to filter out unwanted out-of-band signals, and one or more low-noise amplifiers (LNA) configured to amplify the filtered GNSS signals. In some embodiments, the GNSS front end 354 may also include a notch filter configured to attenuate cellular frequency bands, such as LTE second harmonic interference.

The GNSS receiver 350 is configured to receive GNSS signals from the GNSS front end 354 and compute location information. The GNSS receiver 350 processes the incoming signals to determine position, velocity, and time (PVT) data, which is then communicated to the controller 330 for further processing and transmission. The GNSS receiver 350 supports multiple satellite constellations, enabling reliable and accurate positioning in a variety of environments.

The sensors 360 may be one or more of: a motion sensor, a temperature sensor, a pressure sensor, an optical sensor, a humidity sensor, a gas sensor, an acoustic sensor, a pH sensor, a soil moisture sensor, or any other suitable sensor indicating a condition pertaining to the asset to which the electronic device 300 is coupled. The sensors provide sensor data to the controller 330. Some controllers 330 may have some integrated sensors. In other cases, the sensors 360 are coupled to the controller 330 using a serial interface, such as SPI, 12C, UART, USB, or SDIO.

In the electronic device 300 of FIG. 3, the process of capturing sensor data and location data and transmitting them to a remote server begins with the GNSS antenna 352, which receives satellite signals in both the L1 and L5 frequency bands. These signals are passed to the GNSS front end 354, where they are filtered to remove unwanted out-of-band interference and then amplified to ensure sufficient signal strength for accurate processing. The GNSS front end 354 also separates the signals into their respective L1 and L5 bands before delivering them to the GNSS receiver 350.

The GNSS receiver 350 processes the incoming signals to compute precise position, velocity, and time data, generating the location information for the device. Simultaneously, one or more sensors 360 within the device, such as motion, temperature, or pressure sensors, collect data about the asset's condition or environment. Both the location data from the GNSS receiver 350 and the sensor data from the sensors 360 are provided to the controller 330.

The controller 330 acts as the central processor, managing the flow of information within the device. It receives and processes the data from the GNSS receiver 350 and the sensors 360 and may temporarily store this information in the memory 340 for buffering or logging purposes. When ready, the controller 330 transmits the processed location and sensor data to the network interface 320.

The network interface 320 is responsible for sending the collected data to a remote server over a suitable communication network, such as cellular, LoRaWAN, or Ethernet. Through this coordinated operation of the GNSS antenna 352, GNSS front end 354, GNSS receiver 350, sensors 360, controller 330, memory 340, and network interface 320, the electronic device 300 enables reliable and efficient asset tracking and telematics by continuously capturing and transmitting both location and sensor data to a remote server.

Most GNSS receivers that are currently deployed in asset trackers and/or telematics devices are single band GNSS receivers using the GNSS L1 band. An electronic device that uses only the GNSS L1 band has been shown to lose accuracy due to multipath, and lose satellite fix in urban canyons, as will be shown with reference to FIG. 4.

Figure 4:
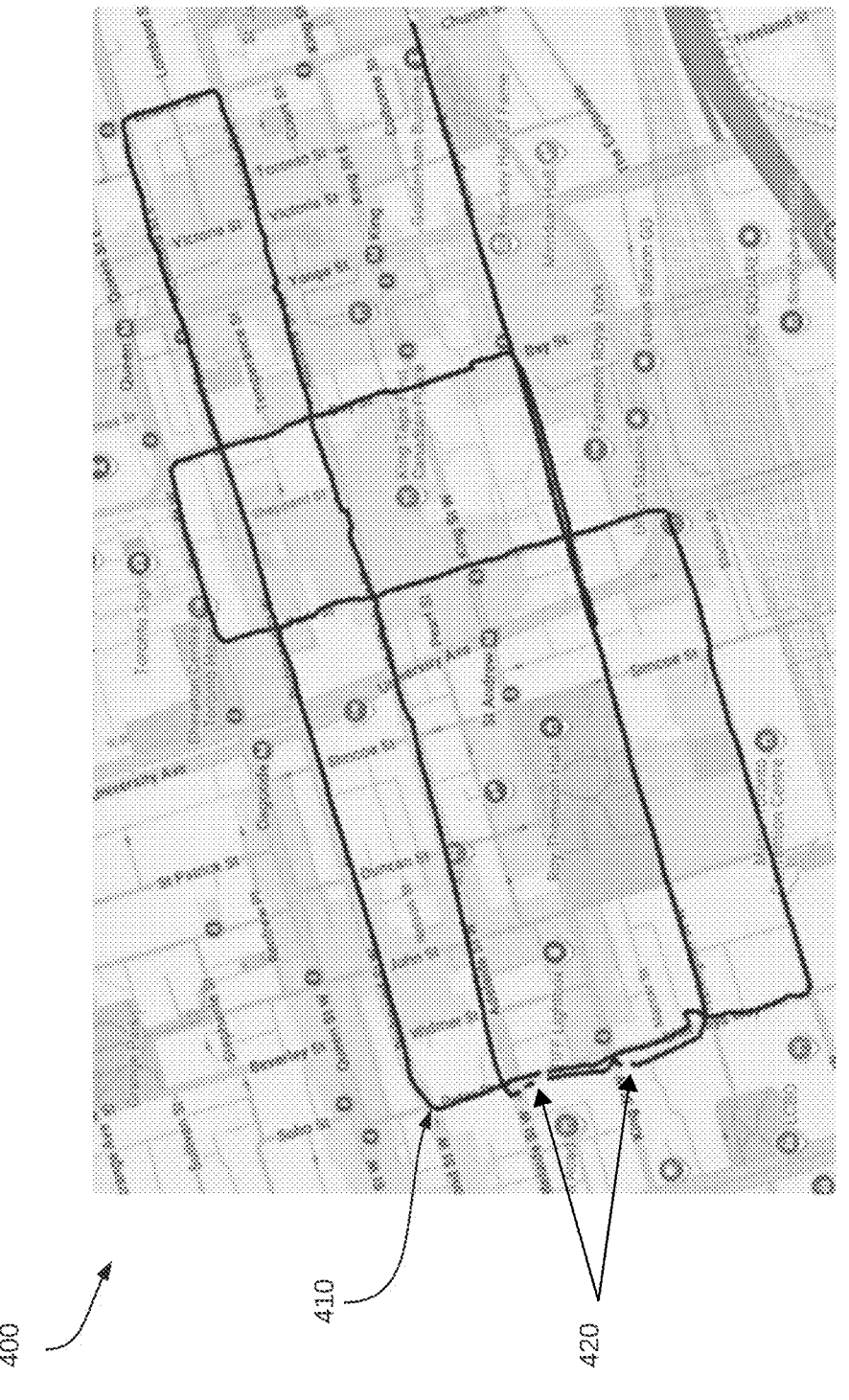
FIG. 4 is a map depicting GNSS L1 signal availability at an electronic device in a mobile asset being driven in an urban canyon.

FIG. 4 shows a map 400 depicting GNSS L1 signal availability at an electronic device located in a mobile asset being driven in an urban canyon. The figure provides a visual representation of how GNSS L1 signals are affected by the urban environment, highlighting areas where the signal remains accessible and areas where the signal becomes unavailable due to obstructions and interference. The map 400 represents the urban canyon environment, with GNSS L1 signal availability 410 indicating regions where the GNSS receiver maintains a satellite fix, and GNSS L1 signal loss 420 indicating regions where the GNSS receiver is unable to maintain a reliable satellite fix due to signal blockage, multipath effects, or interference. As can be seen, the GNSS receiver lost satellite fix a number of times during the trip that the mobile asset was driven in the urban canyon. The same trip was carried out but with a dual-band GNSS system as shown in FIG. 5.

Figure 5:
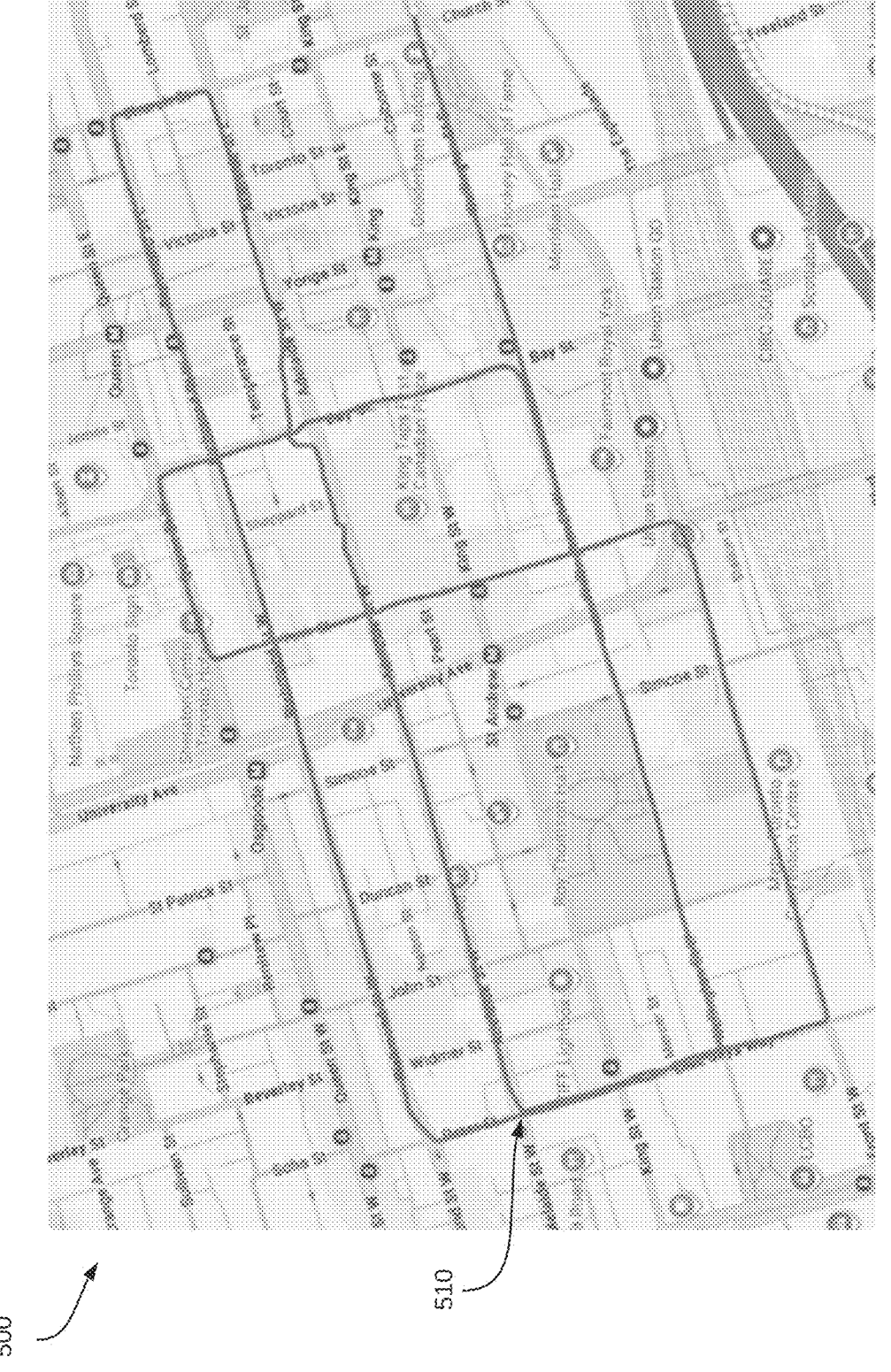
FIG. 5 is a map depicting a dual band GNSS signal availability at the electronic device in the mobile asset being driven in the urban canyon of FIG. 4.

FIG. 5 shows a map 500 depicting dual-band GNSS signal availability at an electronic device 300 installed in a mobile asset (100,200) as the mobile asset traverses the urban canyon environment that was traversed in FIG. 4 with the single band GNSS system using the L1 band. The components and elements shown in FIG. 5 include the map 500 representing the urban canyon, the electronic device 300 deployed in the mobile asset (100,200), and the highlighted regions 510 corresponding to areas of successful dual-band GNSS signal reception. The figure provides a visual overview of how the dual-band GNSS system, utilizing both L1 and L5 frequency bands, enhances signal reliability and positioning accuracy in areas characterized by tall buildings and narrow streets. The map 500 includes highlighted regions 510 that indicate locations where the electronic device 300 maintains a reliable satellite fix by leveraging the dual-band GNSS signals. It is observed that there were no regions where the GNSS receiver lost satellite fix. This shows that wherever the GNSS L1 signal was lost, there was still a GNSS L5 signal. This may be owing to the fact that the GNSS L5 signal is 3 dB higher than the GNSS L1 signal. This test demonstrates the technical advantage of dual-band GNSS systems in overcoming signal degradation caused by multipath effects and blockage, thereby providing enhanced location tracking performance in challenging urban environments.

GNSS L1 signal loss in asset tracking and telematics devices can occur not only due to satellite signal blockage in environments like urban canyons, but also as a result of interference from electronic components within the vehicle, such as the instrument cluster. The instrument cluster may emit radio frequency noise near the L1 band, causing in-band jamming and preventing the GNSS receiver from maintaining a reliable satellite fix, even when the sky view is unobstructed. For example, refer to FIG. 6A and FIG. 6B for examples on how a telematics device 220 may be affected by an instrument cluster of a vehicle.

Figure 6A:
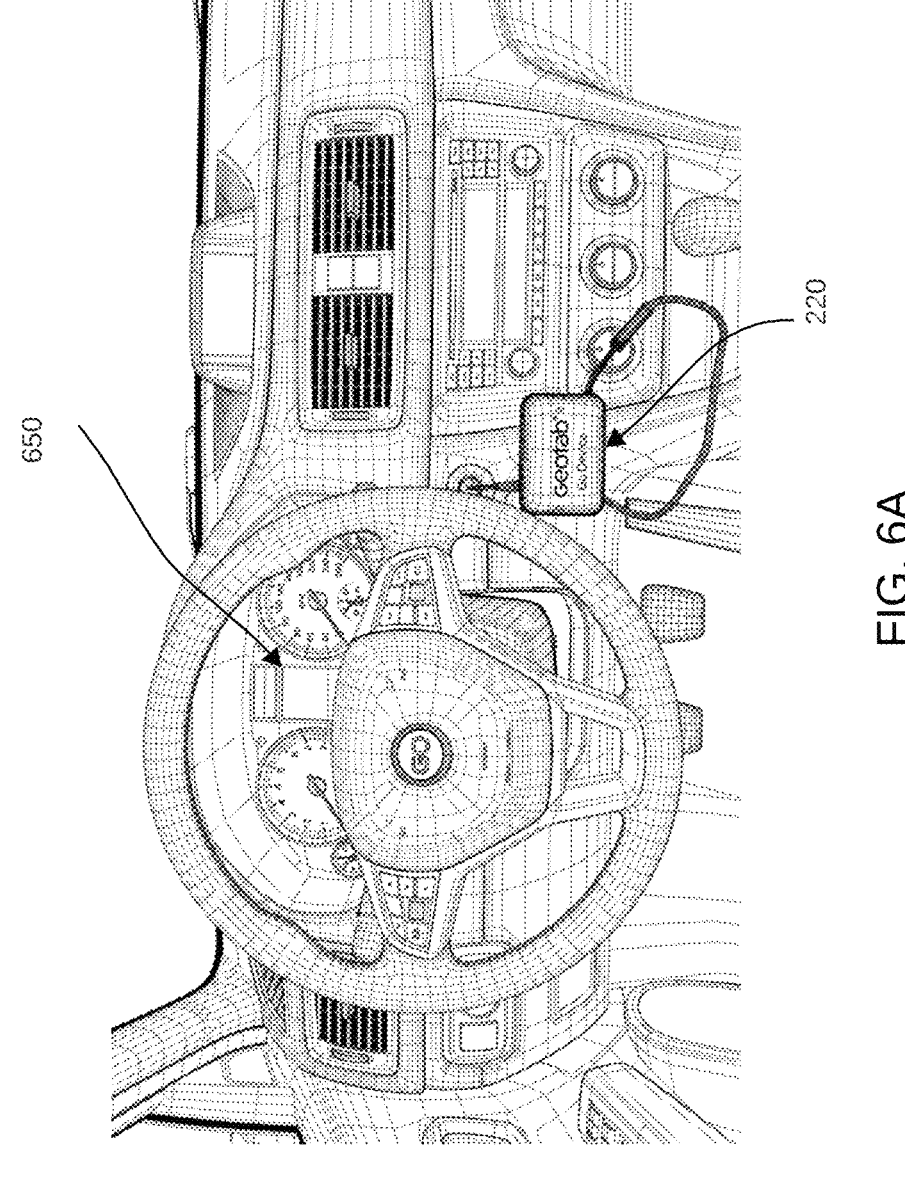
FIG. 6A depicts a vehicle dashboard and a telematics device installed in an interface port in the vehicle dashboard.

FIG. 6A shows a vehicle dashboard 600 featuring an instrument cluster 650 and a telematics device 220 installed in an interface port within the vehicle dashboard 600. The telematics device 220 is positioned to access vehicle data and power through the interface port, such as an OBD-II port. This arrangement enables the telematics device 220 to collect and transmit telematics data to a remote server via a network 50, while also supporting location tracking. In some implementations, interference from the instrument cluster 650 can present a problem for reliable GNSS signal reception by the telematics device 220.

Figure 6B:
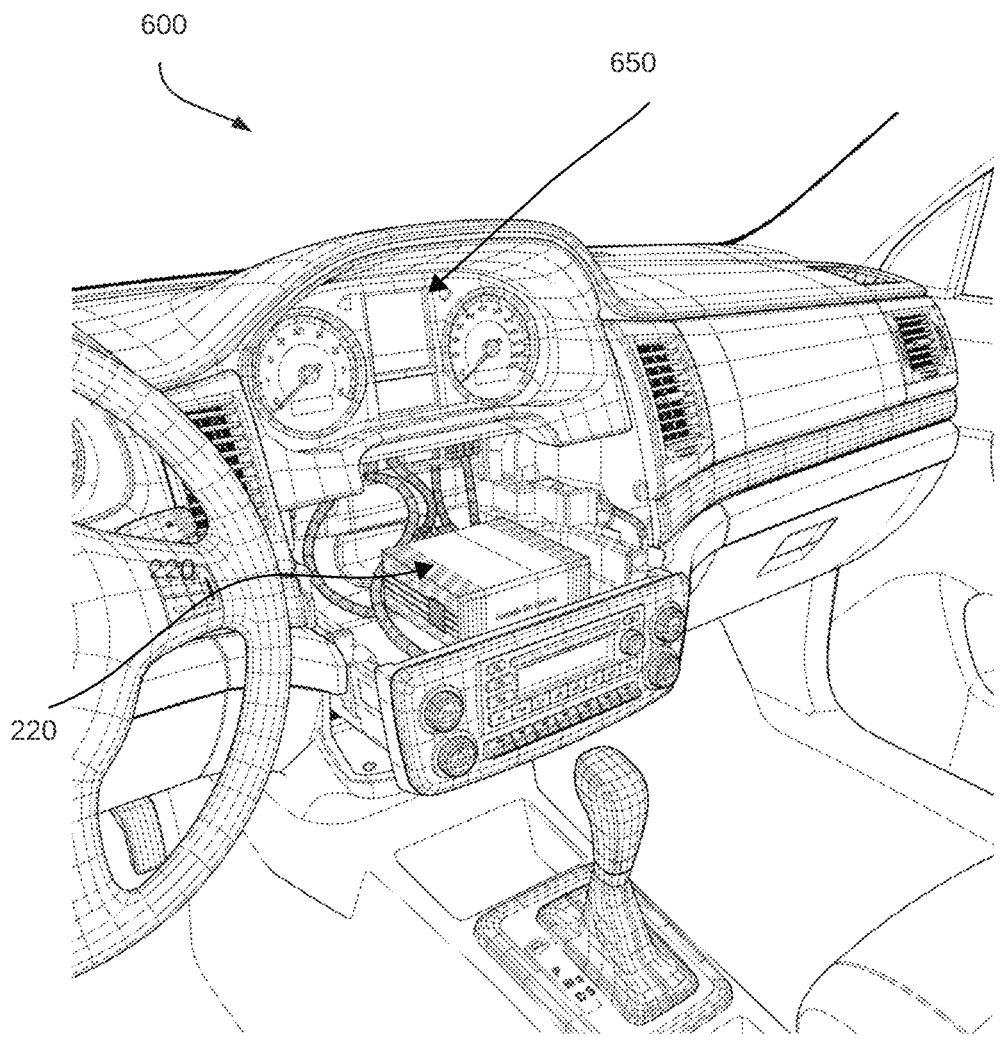
FIG. 6B depicts a vehicle dashboard and a telematics device installed inside the dashboard in close proximity to the instrument cluster of the vehicle dashboard.

FIG. 6B shows a vehicle dashboard 600 with an instrument cluster 650 and a telematics device 220 installed inside the dashboard 600 in close proximity to the instrument cluster 650. The figure depicts the telematics device 220 positioned within the internal structure of the dashboard 600, concealed from view and located near the instrument cluster 650, which is responsible for displaying vehicle information such as speed, fuel level, and engine status. The components shown in FIG. 6B include the vehicle dashboard 600, the instrument cluster 650, and the telematics device 220. This arrangement highlights the potential for electromagnetic interference from the instrument cluster 650 to affect the telematics device 220, particularly in the GNSS L1 band, and underscores the need for advanced GNSS front-end designs to ensure reliable signal reception and accurate positioning in environments with high levels of interference. A test drive has shown loss of GNSS signal due to interference, as shown in FIG. 7.

Figure 7:
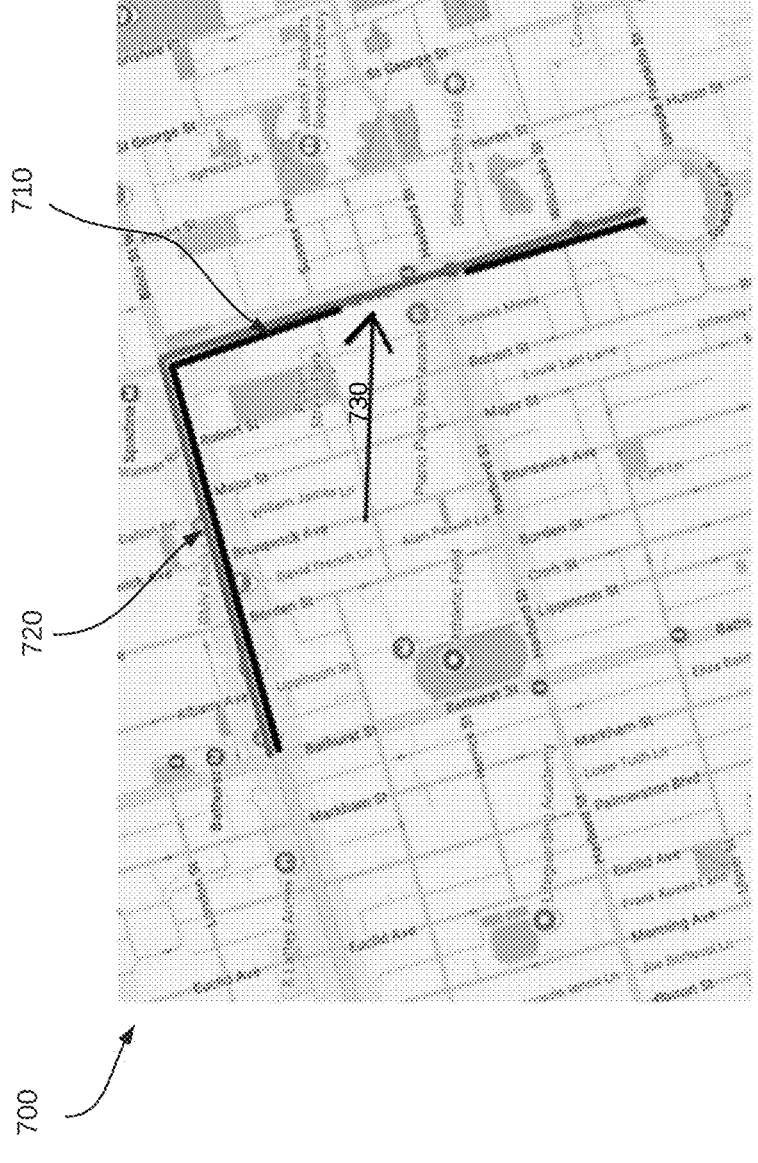
FIG. 7 is a map depicting GNSS signal availability for a first telematics device having a single band GNSS receiver installed in a vehicle that has an instrument cluster that generates interference and a second telematics device having a dual band GNSS receiver installed in the same vehicle.

FIG. 7 shows a map depicting GNSS signal availability for a first telematics device having a single band GNSS receiver installed in a vehicle that has an instrument cluster that generates interference and a second telematics device having a dual band GNSS receiver installed in the same vehicle. The figure provides an overview of how GNSS signal reception is affected by interference from the instrument cluster and demonstrates the technical advantage of dual-band GNSS systems in maintaining reliable positioning. The components and elements shown in FIG. 7 include the map 700 representing the urban area, GNSS L1 signal availability 710 indicating regions where the single band GNSS receiver maintains a satellite fix, GNSS L5 signal availability 720 indicating regions where the dual band GNSS receiver maintains a satellite fix, and GNSS L1 signal jammed due to interference 730 highlighting areas where the single band GNSS receiver loses signal due to interference from the instrument cluster 650. This configuration illustrates the improved performance and reliability of dual-band GNSS receivers in environments with high levels of electromagnetic interference, such as those caused by vehicle instrument clusters.

Figure 8:
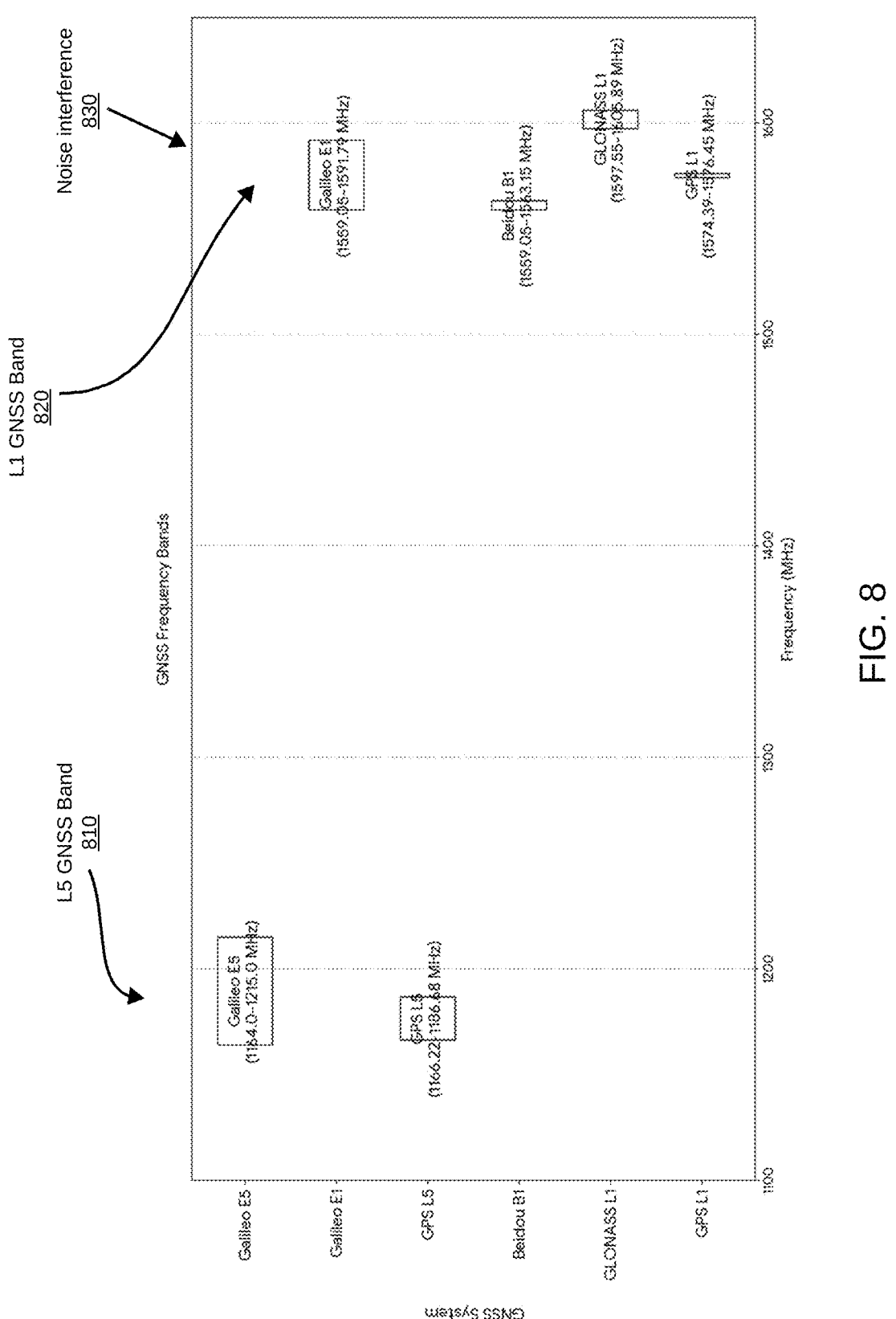
FIG. 8 is a graph depicting the frequency bands used by a number of GNSS technologies, which are in the L1 GNSS or L5 GNSS bands.

Investigating has shown that interference affects the GNSS L1 band because it operates at a specific radio frequency (around 1575.42 MHz) that is susceptible to noise and unwanted signals from other electronic devices. This is depicted in FIG. 8. When nearby systems, such as vehicle instrument clusters or wireless transmitters, emit radio frequency energy close to or overlapping with the L1 band, they can overwhelm or distort the weak satellite signals received by the GNSS antenna. This makes it difficult for the GNSS receiver to distinguish the true satellite signals from the interference, leading to degraded accuracy or complete loss of positioning capability.

FIG. 8 shows a graph depicting the frequency bands used by a number of GNSS technologies, illustrating the allocation and overlap of the L5 GNSS band 810 and the L1 GNSS band 820 across multiple satellite constellations. The figure provides a comparative overview of the frequency ranges associated with GPS, Galileo, BeiDou, and GLONASS, highlighting the L5 GNSS band 810 in the lower frequency range (approximately 1166.22 MHz to 1215.0 MHz) and the L1 GNSS band 820 in the higher frequency range (approximately 1559.05 MHz to 1605.89 MHz). The graph further indicates the presence of potential noise interference 830 affecting the L1 GNSS band 820, which may originate from electronic systems such as vehicle instrument clusters or nearby wireless devices. The frequency ranges for each GNSS system are labeled to show their respective contributions to the L1 and L5 bands, including GPS L1 (1574.42 MHz to 1576.45 MHz), GPS L5 (1166.22 MHz to 1186.68 MHz), Galileo E1 and E5, BeiDou B1 and B2a, and GLONASS L1, thereby demonstrating the multi-band and multi-constellation support, and the technical advantage of dual-band GNSS systems in improving accuracy and reliability in environments with challenging signal conditions.

In view of the foregoing, a GNSS subsystem configured for dual-band GNSS signal processing in asset trackers and telematics devices is desirable. One such GNSS subsystem is shown in FIG. 9.

Figure 9:
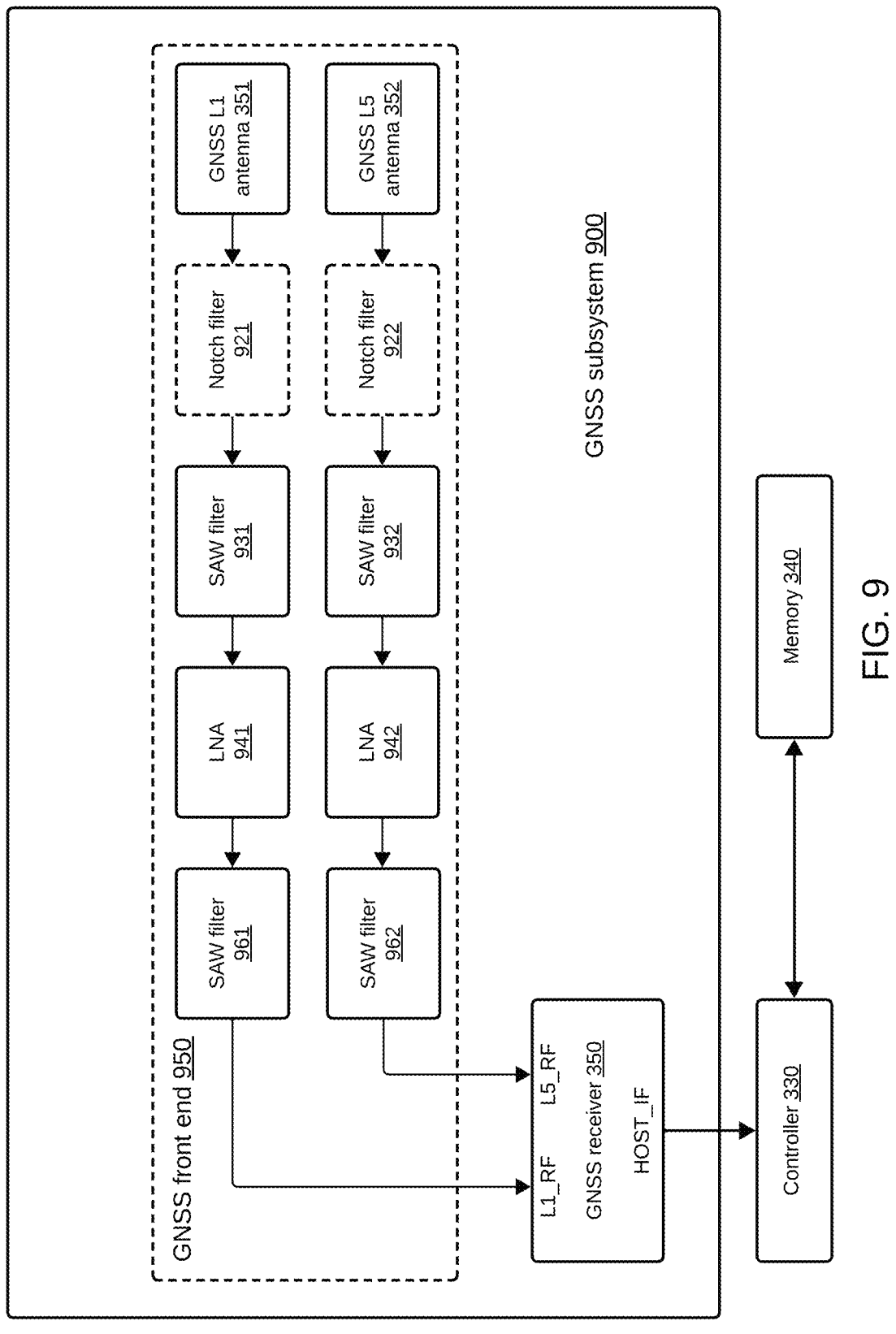
FIG. 9 is a block diagram depicting a GNSS subsystem including a dual-path GNSS front end, shown in conjunction with a controller and a memory of an electronic device, in accordance with embodiments of the present disclosure.

FIG. 9 shows a GNSS subsystem 900 configured for dual-band GNSS signal processing in asset tracking and telematics devices. The figure depicts the architecture of the GNSS subsystem 900, which includes a GNSS front end 950, a GNSS receiver 350, a controller 330, and a memory 340. The GNSS front end 950 implements a dual-path architecture, in which each of the L1 signal and the L5 signal has a dedicated signal path. Specifically, the L1 signal from the GNSS L1 antenna 351 is processed through a notch filter 921, a first SAW filter 931, a low-noise amplifier 941, and a second SAW filter 961. Similarly, the L5 signal from the GNSS L5 antenna 352 is processed through a notch filter 922, a first SAW filter 932, a low-noise amplifier 942, and a second SAW filter 962. The processed L1 and L5 signals are delivered to the GNSS receiver 350, which computes position, velocity, and time data and communicates this information to the controller 330 via a host interface. The controller 330 manages the operation of the GNSS subsystem 900 and stores relevant data in the memory 340.

Each component of the GNSS front end 950 serves a specific purpose in the signal processing chain. The notch filters 921 and 922 are configured to attenuate unwanted cellular frequency bands, such as LTE second harmonic interference, thereby protecting the GNSS signal from in-band jamming and interference. The first SAW filters 931 and 932 are designed to filter out unwanted out-of-band signals, providing high selectivity and ensuring that only the desired GNSS frequency bands are passed through. The low-noise amplifiers 941 and 942 amplify the filtered GNSS signals, improving sensitivity and enabling reliable signal acquisition even in environments with weak satellite signals. The second SAW filters 961 and 962 provide additional filtering to further reject any residual out-of-band interference and to ensure that the signals delivered to the GNSS receiver 350 are clean and within the required frequency bands. This dedicated filtering and amplification for each signal path enhances isolation and signal quality for robust GNSS performance.

The processed L1 and L5 signals are delivered to the GNSS receiver 350, which computes position, velocity, and time data and communicates this information to the controller 330 via a host interface. The controller 330 manages the operation of the GNSS subsystem 900 and stores relevant data in the memory 340. This configuration highlights the use of dedicated filtering and amplification stages for each frequency band, providing high isolation and robust signal quality for reliable GNSS performance in challenging environments.

The dual-path nature of the GNSS front end 950 leads to higher bill of materials (BOM) costs and increased printed circuit board (PCB) space requirements, as each signal path necessitates its own set of notch filters, SAW filters, and low-noise amplifiers. Additionally, the PCB layout is more complicated as a routing tool would have to route more signals around more components. Furthermore, the inclusion of two LNAs in the dual-path architecture results in twice the power consumption compared to a single-path design that has a single LNA. This arrangement, while offering separate filtering and amplification stages for each frequency band, adds to the component count and power usage, which could be less suitable for low-power asset tracking and telematics devices. This motivated the inventor to seek a solution that lowers the BOM cost, reduces power consumption, reduces PCB space requirements, and simplifies PCB layout and routing.

Figure 10:
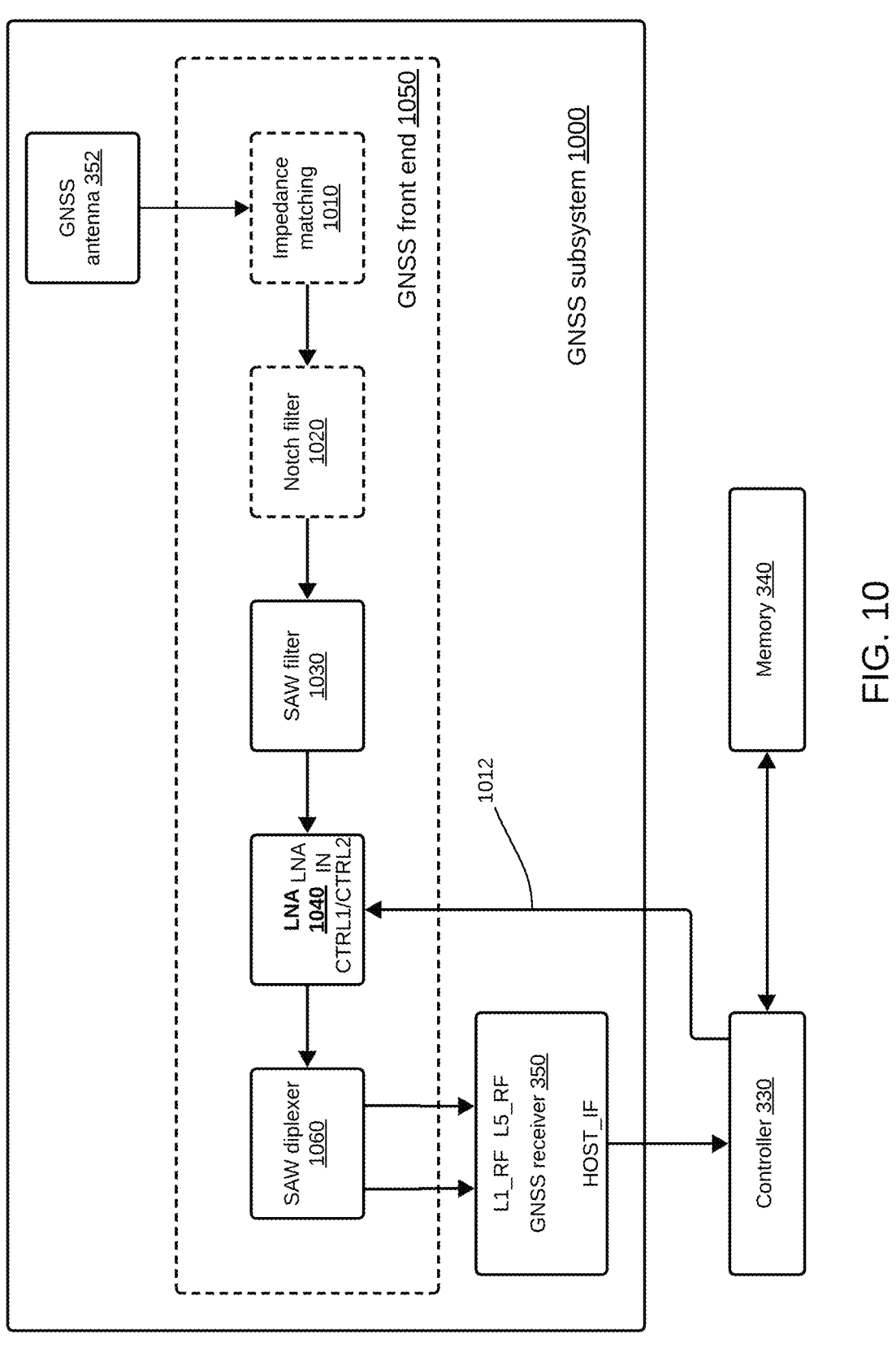
FIG. 10 is a block diagram depicting a GNSS subsystem including a single path GNSS front end, shown in conjunction with a controller and a memory of an electronic device, in accordance with embodiments of the present disclosure.

FIG. 10 shows a block diagram of a GNSS subsystem 1000 implementing a single-path dual-band GNSS front end 1050 for asset tracking and telematics devices. The GNSS subsystem 1000 includes a GNSS antenna 352 configured to receive GNSS signals in both L1 and L5 frequency bands. The received signals are routed through an impedance matching block 1010, followed by a notch filter 1020 positioned upstream of the SAW filter 1030 and configured to attenuate cellular frequency bands, including LTE second harmonic interference.

The SAW filter 1030 is a micro-acoustic filter designed to pass the GPS L5 band (1166.22-1186.68 MHz) and GNSS L1 bands, including BeiDou 1, GPS L1, and GLONASS L1, while providing high out-of-band selectivity. The SAW filter 1030 typically provides at least 38 dB attenuation for cellular and ISM band signals, effectively rejecting unwanted frequencies such as those in the 100-824 MHz, 824-915 MHz, 825-960 MHz, 1427-1463 MHz, 1710-1785 MHz, 1850-2025 MHz, 2300-2690 MHz, 3400-3800 MHz, 4400-4900 MHz, and 5150-5925 MHz ranges.

The filtered signals are amplified by a low-noise amplifier (LNA) 1040, which is a broadband low-power LNA operating across a frequency range of 1164 to 1615 MHz. The LNA 1040 supports multiple operating modes, including low-power mode, standard mode, and high-gain mode, as well as an OFF mode. The gain mode is selectable via control signals from the controller 330, allowing optimization of power consumption and GNSS sensitivity. The LNA 1040 is powered by a supply voltage in the range of 1.1 V to 3.3 V, with current draw varying from 1.5 mA in low-power mode to 3.4 mA in high-gain mode, and down to 1 μA in OFF mode.

The amplified GNSS signals are separated into L1 and L5 frequency bands by a SAW diplexer 1060, which is a micro-acoustic diplexer featuring a three-port configuration with a common antenna port and two channel ports for L1 and L5 bands. The SAW diplexer 1060 provides at least 40 dB isolation between the L1 and L5 frequency bands, ensuring that the two signals do not interfere with each other. The device is designed for ultra-low-loss operation and requires no external matching components, with pass bands for GPS L5 (1166.22-1186.68 MHz) and GNSS L1 (1559.05-1563.15 MHz, 1574.39-1576.45 MHz, 1597.55-1605.89 MHz).

The separated signals are delivered to the GNSS receiver 350, which computes location information and communicates with the controller 330 and memory 340.

The single-path GNSS front end 1050 provides several advantages over dual-path designs, including a reduced number of components, lower power consumption due to the use of a single LNA, reduced printed circuit board (PCB) space requirements, simplified PCB layout and routing, and minimized crosstalk and interference. This architecture enhances signal reliability in urban environments by utilizing the L5 band signal, which is at least 3 dB stronger than the L1 band signal and supports multi-constellation GNSS operation for improved accuracy and robustness.

In various embodiments, the single-path dual-band GNSS front-end system may be implemented with different configurations and components to optimize performance, cost, and adaptability. For instance, the GNSS antenna 352 may be a broadband antenna capable of supporting not only GPS signals but also GLONASS, Galileo and BeiDou constellations, thereby enhancing global compatibility. The SAW filter 1030 may be selected from commercially available models, such as the Qualcomm B8375 or similar, with attenuation levels tailored to specific interference environments, such as cellular or ISM bands. The low-noise amplifier (LNA) 1040 may support multiple gain modes, including low-power, standard, and high-gain modes, which can be dynamically controlled via GPIO signals from a microcontroller to balance power consumption and signal sensitivity. The SAW diplexer 1060 may be a micro-acoustic diplexer, such as the Infineon B1267, providing at least 40 dB isolation between the L1 and L5 frequency bands, or the SAW diplexer may be substituted with equivalent components from other manufacturers like Murata or Qorvo, depending on availability and cost considerations. In some embodiments, an optional LTE notch filter 1020 may be included upstream of the SAW filter 1030 to mitigate second harmonic interference from LTE bands, particularly in environments with high RF noise. The system may also be implemented on a multi-layer PCB with 50Ω impedance-matched RF traces to ensure signal integrity and minimize losses. Additionally, the architecture may be extended to support other dual-frequency pairs, such as Galileo E1/E5a, or even tri-band configurations using a triplexer. For applications requiring high-gain antennas, the LNA 1040 may include a bypass option to further reduce power consumption. These variations allow the system to be tailored for diverse use cases, including asset tracking, telematics, and IoT applications, while maintaining the advantages of reduced component count, lower power consumption, and minimized PCB space.

Figure 11:
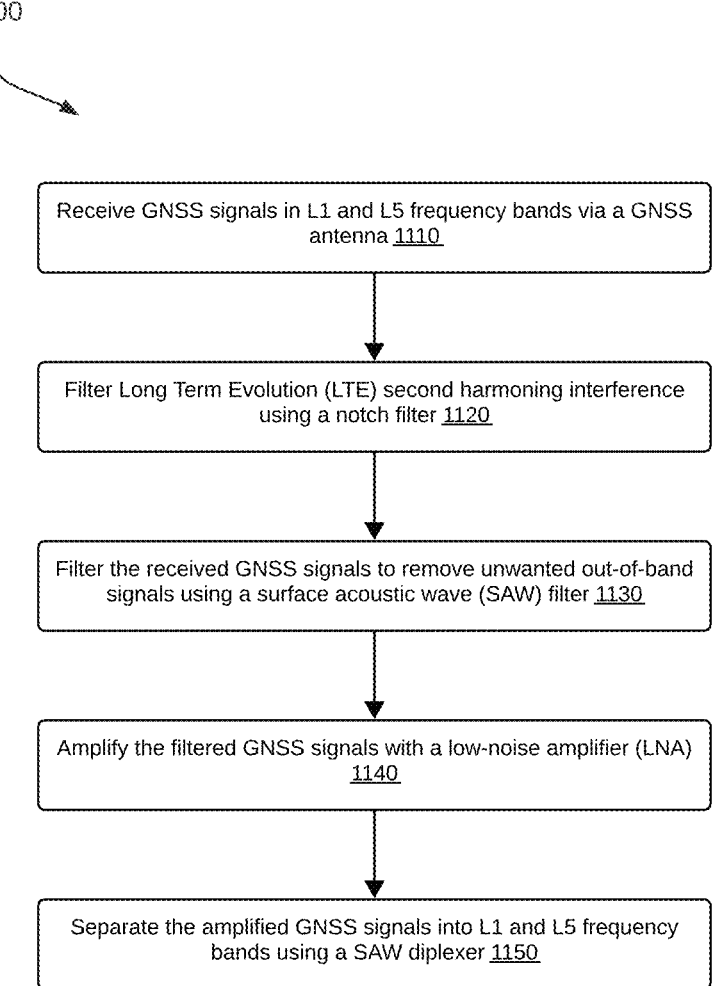
FIG. 11 is a flowchart depicting a method for processing dual-band GNSS signals in a single-path front-end system.

FIG. 11 shows a flowchart depicting a method 1100 for processing dual-band GNSS signals in a single-path front-end system. The process begins with receiving GNSS signals in L1 and L5 frequency bands via a GNSS antenna 352. The received signals are first filtered to attenuate LTE second-harmonic interference using a notch filter 1020. Next, the signals are filtered to remove unwanted out-of-band signals using a surface acoustic wave (SAW) filter 1030. The filtered signals are then amplified by a low-noise amplifier (LNA) 1040, which supports multiple gain modes for dynamic optimization. Subsequently, the amplified GNSS signals are separated into L1 and L5 frequency bands using a SAW diplexer 1060, providing high isolation between the bands and enabling independent delivery of the separated signals to the GNSS receiver for location computation.

In various embodiments, the method for processing dual-band GNSS signals in a single-path front-end system may be adapted to suit different operational requirements and deployment scenarios, with each step of the method offering distinct advantages. In one embodiment, the method begins by receiving GNSS signals in both L1 and L5 frequency bands via a broadband GNSS antenna 352, which may be positioned externally or internally within the asset, allowing for flexible installation in vehicles, equipment, or stationary assets. The received signals are then filtered to remove unwanted out-of-band signals using a surface acoustic wave (SAW) filter 1030, and in some embodiments, a notch filter 1020 may be positioned upstream to specifically attenuate cellular frequency bands and LTE second harmonic interference, thereby enhancing signal integrity in environments with high RF noise. The filtered signals are subsequently amplified by a low-noise amplifier (LNA) 1040, which may operate in selectable gain modes-low-power, standard, or high-gain-based on real-time signal strength and power consumption requirements, with the gain mode dynamically controlled by a microcontroller via GPIO signals. This dynamic gain adjustment provides the advantage of optimizing power efficiency and GNSS sensitivity for varying operational conditions, such as urban canyons or remote locations. After amplification, the method separates the GNSS signals into L1 and L5 frequency bands using a SAW diplexer 1060, which provides at least 40 dB isolation between the bands, ensuring robust signal separation and minimizing crosstalk. The separated signals are then delivered to a GNSS receiver 350, which computes position, velocity, and time (PVT) data at a high update rate, supporting real-time asset tracking. In some embodiments, the method may include matching the impedance of the GNSS antenna to the front-end system using a matching network 1010, further improving signal transmission and reducing losses. The processed location data may be stored in memory 340 for later transmission or immediately sent to a remote server via a network interface 320, which may utilize cellular, LoRaWAN, or Ethernet connectivity for deployment flexibility. The advantages of these method variations include lower bill of materials (BOM) cost, reduced printed circuit board (PCB) space, simplified layout and routing, minimized crosstalk and interference, improved power management, and enhanced GNSS signal reliability and accuracy in challenging environments such as urban corridors or areas with significant electronic interference. These embodiments allow the method to be tailored for diverse asset tracking, telematics, and IoT applications, ensuring robust and efficient dual-band GNSS signal processing.

In one aspect of the present disclosure, there is provided a single-path dual-band GNSS front-end system, comprising a GNSS antenna 352 configured to receive GNSS signals in L1 and L5 frequency bands as shown in FIG. 3 and FIG. 10, a surface acoustic wave (SAW) filter 1030 configured to filter out unwanted out-of-band signals from the received GNSS signals as shown in FIG. 10, a low-noise amplifier (LNA) 1040 configured to amplify the filtered GNSS signals as shown in FIG. 10, and a SAW diplexer 1060 configured to separate the amplified GNSS signals into L1 and L5 frequency bands as shown in FIG. 10, wherein the system is configured to reduce the number of components compared to dual-path designs, thereby reducing power consumption and printed circuit board space. This improves compactness, lowers energy consumption, and simplifies routing.

In some implementations, the SAW diplexer 1060 provides at least 40 dB isolation between the L1 and L5 frequency bands as shown in FIG. 10. This minimizes inter-band interference and secures cleaner dual-band reception.

In some implementations, the low-noise amplifier 1040 supports multiple gain modes including a low-power mode, a standard mode, and a high-gain mode, and the gain mode is selectable based on signal strength and power consumption requirements as shown in FIG. 10. This enables adaptive sensitivity control and improves battery longevity. In some implementations, the SAW filter 1030 is configured to attenuate cellular and ISM band signals by at least 38 dB as shown in FIG. 10. This improves GNSS signal integrity by rejecting aggressive out-of-band interferers.

In some implementations, the LNA 1040 is controlled by a microcontroller via GPIO lines through the controller 330 shown in FIG. 3. This enables dynamic gain management and improves performance under changing RF conditions.

In some implementations, the SAW diplexer 1060 is a micro-acoustic diplexer having a three-port configuration with a common antenna port and two channel ports for L1 and L5 bands as shown in FIG. 10. This eases integration and improves isolation without external matching parts.

In some implementations, the GNSS antenna 352 is a broadband antenna supporting GPS L1, GPS L5, Galileo, GLONASS, and BeiDou constellations as shown in FIG. 3. This increases satellite availability and improves positioning accuracy.

In some implementations, the single-path dual-band GNSS front-end system further comprises an LTE notch filter 1020 positioned ahead of the SAW filter 1030 to reject LTE second harmonic interference as shown in FIG. 10. This reduces in-band jamming and stabilizes satellite fixes near cellular radios.

In some implementations, the single-path dual-band GNSS front-end system further comprises a notch filter 1020 positioned upstream of the SAW filter 1030 and configured to filter out cellular frequency bands as shown in FIG. 10. This strengthens immunity to co-located transmitters and improves reception robustness.

In some implementations, the notch filter 1020 is configured to attenuate LTE second harmonic interference as shown in FIG. 10. This suppresses harmonic overlap and improves receiver sensitivity.

In another aspect of the present disclosure, there is provided a method for processing dual-band GNSS signals in a single-path front-end system, comprising receiving GNSS signals in L1 and L5 frequency bands via a GNSS antenna 352 as shown in FIG. 3 and FIG. 10, filtering the received GNSS signals to remove unwanted out-of-band signals using a surface acoustic wave (SAW) filter 1030 as shown in FIG. 10, amplifying the filtered GNSS signals with a low-noise amplifier (LNA) 1040 as shown in FIG. 10, and separating the amplified GNSS signals into L1 and L5 frequency bands using a SAW diplexer 1060 as shown in FIG. 10, wherein the method reduces the number of components compared to dual-path designs, thereby reducing power consumption and printed circuit board space. This enhances efficiency while preserving high-quality dual-band processing.

In some implementations, the method of the foregoing aspect further comprises providing at least 40 dB isolation between the L1 and L5 frequency bands using the SAW diplexer 1060 as shown in FIG. 10. This reduces mutual interference and secures reliable dual-frequency operation.

In some implementations, the method of the foregoing aspect further comprises selecting a gain mode for the low-noise amplifier 1040 from among a low-power mode, a standard mode, and a high-gain mode, based on signal strength and power consumption requirements, using controller 330 inputs shown in FIG. 3. This improves sensitivity control and balances energy use.

In some implementations, the method of the foregoing aspect further comprises controlling the gain mode of the LNA 1040 using a microcontroller via GPIO signals from controller 330 shown in FIG. 3. This enables adaptive amplification and improves resilience to changing RF conditions.

In some implementations, the method of the foregoing aspect further comprises filtering LTE second harmonic interference using a notch filter 1020 prior to the SAW filter 1030 as shown in FIG. 10. This reduces in-band noise that can mask satellite signals.

In some implementations, the method of the foregoing aspect further comprises matching the impedance of the GNSS antenna 352 to the front-end system using a matching network 1010 as shown in FIG. 10. This improves power transfer and reduces reflections. In some implementations, the method of the foregoing aspect further comprises supporting GNSS signals from multiple bands and multiple constellations including GPS L1, GPS L5, GLONASS, Galileo, and BeiDou through GNSS antenna 352 and GNSS receiver 350 shown in FIG. 3. This increases satellite visibility and improves accuracy.

In some implementations, the method of the foregoing aspect further comprises filtering out cellular frequency bands from the received GNSS signals using a notch filter 1020 positioned upstream of the SAW filter 1030 as shown in FIG. 10. This strengthens resilience to co-located radios and improves signal fidelity.

In some implementations, the method of the foregoing aspect wherein the notch filter 1020 is configured to attenuate LTE second harmonic interference comprises attenuation in bands overlapping the GNSS operating spectrum as shown in FIG. 10. This reduces desensitization and secures cleaner GNSS reception.

In yet another aspect of the present disclosure, there is provided an electronic device comprising a single-path dual-band GNSS front-end system including a GNSS antenna 352 configured to receive GNSS signals in L1 and L5 frequency bands as shown in FIG. 3, a surface acoustic wave (SAW) filter 1030 configured to filter out unwanted out-of-band signals from the received GNSS signals as shown in FIG. 10, a low-noise amplifier (LNA) 1040 configured to amplify the filtered GNSS signals as shown in FIG. 10, and a SAW diplexer 1060 configured to separate the amplified GNSS signals into L1 and L5 frequency bands as shown in FIG. 10; a GNSS receiver 350 configured to receive the separated L1 and L5 signals and compute a location as shown in FIG. 3; a controller 330 coupled to the GNSS receiver 350 as shown in FIG. 3; a memory 340 coupled to the controller 330 as shown in FIG. 3; and a network interface 320 configured to send the computed location to a remote server over a network as shown in FIG. 3; wherein the electronic device is configured to reduce the number of components compared to dual-path designs, thereby reducing power consumption and printed circuit board space. This yields a compact, power-efficient platform with robust positioning. In some implementations, the SAW diplexer 1060 provides at least 40 dB isolation between the L1 and L5 frequency bands as shown in FIG. 10. This minimizes crosstalk and improves dual-band fidelity.

In some implementations, the low-noise amplifier 1040 supports multiple gain modes including a low-power mode, a standard mode, and a high-gain mode, and the gain mode is selectable based on signal strength and power consumption requirements with control from controller 330 shown in FIG. 3. This enhances sensitivity while managing energy use. In some implementations, the electronic device is configured to provide enhanced signal reliability in urban environments by utilizing the L5 band signal through GNSS receiver 350, which processes L1 and L5, as shown in FIG. 3. This improves tracking continuity in dense cities.

In some implementations, the GNSS receiver 350 is configured to provide position, velocity, and time data at a rate of at least 25 Hz as shown in FIG. 3. This supports high-frequency updates for real-time applications.

In some implementations, the network interface 320 is configured to transmit location data using a cellular, LoRaWAN, or Ethernet connection as shown in FIG. 3. This increases deployment flexibility across diverse networks.

In some implementations, the controller 330 is configured to select the LNA gain mode based on received signal strength indication affecting LNA 1040 as coordinated with the GNSS receiver 350, as shown in FIG. 3. This optimizes performance under varying signal conditions.

In some implementations, the memory 340 stores GNSS location data and sensor data for later transmission as shown in FIG. 3. This enables reliable logging and deferred reporting.

In some implementations, the electronic device further comprises one or more sensors 360 selected from the group consisting of a motion sensor, temperature sensor, and pressure sensor as shown in FIG. 3. This expands asset condition monitoring capabilities. In some implementations, the GNSS receiver 350 is configured to operate with multiple GNSS constellations including GPS L1, GPS L5, Galileo, GLONASS, and BeiDou as shown in FIG. 3. This increases satellite availability and improves accuracy.

In some implementations, the electronic device is powered by a battery 310 and includes an energy harvester such as a solar panel as shown in FIG. 3. This extends operating life and reduces maintenance.

In some implementations, the electronic device further comprises a notch filter 1020 positioned upstream of the SAW filter 1030 and configured to filter out cellular frequency bands as shown in FIG. 10. This enhances immunity to co-located cellular radios.

In some implementations, the notch filter 1020 is configured to attenuate LTE second harmonic interference as shown in FIG. 10. This improves reception quality by suppressing in-band harmonics.

In the present disclosure, all terms referred to in singular form are meant to encompass plural forms of the same. Likewise, all terms referred to in plural form are meant to encompass singular forms of the same. Unless defined otherwise, all technical and scientific terms used herein have the same meaning as commonly understood by one of ordinary skill in the art to which this disclosure pertains.

While the present invention has been described with respect to the non-limiting embodiments, it is to be understood that the invention is not limited to the disclosed embodiments. Persons skilled in the art understand that the disclosed invention is intended to cover various modifications and equivalent arrangements included within the scope of the appended claims. Thus, the present invention should not be limited by any of the described embodiments.

The invention claimed is:

1. A single-path dual-band GNSS front-end system, comprising:

a GNSS antenna configured to receive GNSS signals in L1 and L5 frequency bands;

a surface acoustic wave (SAW) filter configured to filter out unwanted out-of-band signals from the received GNSS signals;

a low-noise amplifier (LNA) configured to amplify the filtered GNSS signals; and a SAW diplexer configured to separate the amplified GNSS signals into L1 and L5 frequency bands;

wherein the system is configured to reduce the number of components compared to dual-path designs, thereby reducing power consumption and printed circuit board (PCB) space.

2. The system of claim 1, wherein the SAW diplexer provides at least 40 dB isolation between the L1 and L5 frequency bands.

3. The system of claim 1, wherein the low-noise amplifier (LNA) supports multiple gain modes including a low-power mode, a standard mode, and a high-gain mode, and wherein the gain mode is selectable based on signal strength and power consumption requirements.

4. The system of claim 1, wherein the SAW filter is configured to attenuate cellular and ISM band signals by at least 38 dB.

5. The system of claim 1, wherein the LNA is controlled by a microcontroller via GPIO lines.

6. The system of claim 1, wherein the SAW diplexer is a micro-acoustic diplexer having a three-port configuration with a common antenna port and two channel ports for L1 and L5 bands.

7. The system of claim 1, wherein the GNSS antenna is a broadband antenna supporting GPS L1, GPS L5, Galileo, GLONASS, and BeiDou constellations.

8. The system of claim 1, further comprising an LTE notch filter positioned ahead of the SAW filter to reject LTE second harmonic interference.

9. The system of claim 1, further comprising a notch filter positioned upstream of the SAW filter and configured to filter out cellular frequency bands.

10. The system of claim 9, wherein the notch filter is configured to attenuate LTE second harmonic interference.

11. A method for processing dual-band GNSS signals in a single-path front-end system, comprising:

receiving GNSS signals in L1 and L5 frequency bands via a GNSS antenna;

filtering the received GNSS signals to remove unwanted out-of-band signals using a surface acoustic wave (SAW) filter;

amplifying the filtered GNSS signals with a low-noise amplifier (LNA); and separating the amplified GNSS signals into L1 and L5 frequency bands using a SAW diplexer;

wherein the method reduces the number of components compared to dual-path designs, thereby reducing power consumption and printed circuit board (PCB) space.

12. The method of claim 11, further comprising providing at least 40 dB isolation between the L1 and L5 frequency bands using the SAW diplexer.

13. The method of claim 11, further comprising selecting a gain mode for the low-noise amplifier (LNA) from among a low-power mode, a standard mode, and a high-gain mode, based on signal strength and power consumption requirements.

14. The method of claim 11, further comprising controlling a gain mode of the LNA using a microcontroller via GPIO signals.

15. The method of claim 11, further comprising filtering LTE second harmonic interference using a notch filter prior to the SAW filter.

16. The method of claim 11, further comprising matching the impedance of the GNSS antenna to the front-end system using a matching network.

17. The method of claim 11, further comprising supporting GNSS signals from multiple bands and multiple constellations including GPS L1, GPS L5, GLONASS, Galileo, and BeiDou.

18. The method of claim 11, further comprising filtering out cellular frequency bands from the received GNSS signals using a notch filter positioned upstream of the SAW filter.

19. The method of claim 18, wherein the notch filter is configured to attenuate LTE second harmonic interference.

20. An electronic device comprising:

a single-path dual-band GNSS front-end system including a GNSS antenna configured to receive GNSS signals in L1 and L5 frequency bands, a surface acoustic wave (SAW) filter configured to filter out unwanted out-of-band signals from the received GNSS signals, a low-noise amplifier (LNA) configured to amplify the filtered GNSS signals, and a SAW diplexer configured to separate the amplified GNSS signals into L1 and L5 frequency bands;

a GNSS receiver configured to receive the separated L1 and L5 signals and compute a location;

a controller coupled to the GNSS receiver;

a memory coupled to the controller; and a network interface configured to send the computed location to a remote server over a network;

wherein the electronic device is configured to reduce the number of components compared to dual-path designs, thereby reducing power consumption and printed circuit board (PCB) space.

* * * * *